(12) United States Patent
Shibui et al.

(10) Patent No.: US 7,530,230 B2
(45) Date of Patent: May 12, 2009

(54) SUPERCHARGER WITH ELECTRIC MOTOR

(75) Inventors: Yasuyuki Shibui, Tokyo (JP); Yukio Takahashi, Tokyo (JP)

(73) Assignee: IHI Corporation, Tokyo (JP)

( * ) Notice: Subject to any disclaimer, the term of this patent is extended or adjusted under 35 U.S.C. 154(b) by 0 days.

(21) Appl. No.: 11/462,807

(22) Filed: Aug. 7, 2006

(65) Prior Publication Data
US 2009/0056681 A1    Mar. 5, 2009

(30) Foreign Application Priority Data
Aug. 5, 2005    (JP) ............................ 2005-227605

(51) Int. Cl.
| | |
|---|---|
| F02B 33/44 | (2006.01) |
| F02B 37/00 | (2006.01) |
| F02B 37/16 | (2006.01) |
| F02B 37/14 | (2006.01) |
| F02B 37/12 | (2006.01) |
| F02B 37/10 | (2006.01) |
| F04B 39/06 | (2006.01) |
| F04B 39/02 | (2006.01) |
| F04D 31/00 | (2006.01) |
| F04D 23/00 | (2006.01) |
| H02K 9/19 | (2006.01) |

(52) U.S. Cl. ...................... 60/608; 60/607; 60/605.3; 290/52; 417/407; 417/366; 310/54; 310/55; 415/116; 415/95; 415/53.1

(58) Field of Classification Search ................ 60/605.3, 60/607–609; 290/52; 417/407, 366; 310/54–55; 415/116, 95, 53.1; H02K 9/19
See application file for complete search history.

(56) References Cited

U.S. PATENT DOCUMENTS

| | | | | |
|---|---|---|---|---|
| 3,742,123 | A | | 6/1973 | Haub |
| 4,253,031 | A | * | 2/1981 | Frister .......................... 60/607 |
| 4,745,755 | A | | 5/1988 | Kawamura ................... 60/608 |

(Continued)

FOREIGN PATENT DOCUMENTS

DE    41 15 273 C1 *    6/1992

(Continued)

OTHER PUBLICATIONS

Office Action issued in related U.S. Appl. No. 11/463,090, dated Jul. 10, 2007.

(Continued)

*Primary Examiner*—Thai-Ba Trieu
(74) *Attorney, Agent, or Firm*—Griffin & Szipl, P.C.

(57) ABSTRACT

In a supercharger (10) with an electric motor in accordance with the invention, an inner side of the center housing (10) is provided with an air introduction path (38) introducing a part of a compressed air within the compressor housing (8) to the electric motor (20), and a cooling structure portion (40) cooling the air flowing through the air introduction path (38). The center housing (14) has a cooling fluid flow path (34) which is formed so as to surround the electric motor (20) and puts a cooling fluid for cooling the electric motor (20) in circulation inside. The cooling structure portion (40) is structured such as to be capable of heat exchanging between the cooling fluid and the air flowing through the air introduction path (38).

7 Claims, 3 Drawing Sheets

U.S. PATENT DOCUMENTS

| | | | |
|---|---|---|---|
| 4,757,686 A | 7/1988 | Kawamura et al. | 60/608 |
| 4,833,887 A | 5/1989 | Kawamura et al. | 60/608 |
| 5,121,605 A * | 6/1992 | Oda et al. | 60/608 |
| 5,323,613 A | 6/1994 | Akiyama | 60/608 |
| 5,605,045 A | 2/1997 | Halimi et al. | 60/607 |
| 5,798,587 A * | 8/1998 | Lee | 310/54 |
| 5,834,117 A | 11/1998 | Onishi | |
| 5,857,332 A * | 1/1999 | Johnston et al. | 60/607 |
| 5,870,894 A | 2/1999 | Woollenweber et al. | 60/607 |
| 5,904,471 A | 5/1999 | Woollenweber et al. | 417/423.14 |
| 6,032,466 A * | 3/2000 | Woollenweber et al. | 60/607 |
| 6,102,672 A * | 8/2000 | Woollenweber et al. | 417/366 |
| 6,129,524 A * | 10/2000 | Woollenweber et al. | 417/366 |
| 6,145,314 A * | 11/2000 | Woollenweber et al. | 60/607 |
| 6,218,747 B1 * | 4/2001 | Tsuruhara | 310/54 |
| 6,257,834 B1 | 7/2001 | Bremer et al. | 417/406 |
| 6,278,199 B1 | 8/2001 | Grant et al. | |
| 6,293,769 B1 * | 9/2001 | Radermacher et al. | 417/366 |
| 6,416,281 B1 | 7/2002 | Bremer et al. | 416/95 |
| 6,449,950 B1 * | 9/2002 | Allen et al. | 60/607 |
| 6,609,375 B2 * | 8/2003 | Allen et al. | 60/608 |
| 6,647,724 B1 | 11/2003 | Arnold et al. | 60/608 |
| 6,668,553 B1 * | 12/2003 | Ghizawi | 60/605.3 |
| 6,986,648 B2 * | 1/2006 | Williams et al. | 417/423.8 |
| 7,010,916 B2 | 3/2006 | Sumser et al. | 417/407 |
| 7,360,361 B2 * | 4/2008 | Prusinski et al. | 60/608 |
| 2003/0051475 A1 | 3/2003 | Allen et al. | 60/608 |
| 2003/0118461 A1 | 6/2003 | Hodapp et al. | 417/423.7 |
| 2006/0123783 A1 * | 6/2006 | Philippe | 60/607 |
| 2006/0245913 A1 | 11/2006 | Thiele et al. | 415/116 |
| 2007/0036664 A1 * | 2/2007 | Shibui et al. | 417/407 |

FOREIGN PATENT DOCUMENTS

| | | |
|---|---|---|
| DE | 100 22 113 A1 | 11/2001 |
| DE | 101 56 704 A1 | 5/2003 |
| DE | 1005 052363 A1 * | 3/2007 |
| EP | 79100 A1 * | 5/1983 |
| EP | 0 212 988 | 3/1987 |
| EP | 0 304 259 A1 | 2/1989 |
| EP | 1 348 848 A2 | 10/2003 |
| FR | 2 859 499 A1 | 3/2005 |
| GB | 2 021 874 A | 12/1979 |
| JP | 01019122 | 1/1989 |
| JP | 1-171006 | 7/1989 |
| JP | 02-99722 | 4/1990 |
| JP | 03138430 A | 6/1991 |
| JP | 05199708 A * | 8/1993 |
| JP | 06346748 A | 12/1994 |
| JP | 07102988 A | 4/1995 |
| JP | 2000-130176 | 5/2000 |
| JP | 2000-514897 | 11/2000 |
| JP | 3389748 B2 | 3/2003 |
| JP | 2003-293785 | 10/2003 |
| JP | 2004-044451 | 2/2004 |
| JP | 2004-44452 | 2/2004 |
| JP | 2005-069178 | 3/2005 |
| WO | WO 98/02652 | 1/1998 |
| WO | 98/30790 A2 | 7/1998 |
| WO | 98/30790 A3 | 7/1998 |
| WO | 2005/024202 A1 | 3/2005 |
| WO | 2005028876 A1 | 3/2005 |
| WO | 2005/113961 A1 | 12/2005 |

OTHER PUBLICATIONS

Office Action issued in related U.S. Appl. No. 11/463,665, mailed Aug. 3, 2007.
Search Report issued in related European application No. 06 01 7066 completed Oct. 16, 2006.
Notice of Allowance issued in related U.S. Appl. No. 11/463,665, mailed Dec. 19, 2007.
Extended European Search Report issued in corresponding application No. 06 01 6269, completed Oct. 10, 2007.
Extended European Search Report issued in related application No. 06 01 6455, completed Oct. 12, 2007.
Office Action issued in related U.S. Appl. No. 11/465,874, dated Aug. 19, 2008.
Co-pending U.S. Appl. No. 12/280,816, filed on Aug. 27, 2008.
Co-pending U.S. Appl. No. 11/617,211, filed on Dec. 28, 2006.
Office Action issued on Jan. 5, 2009 in related co-pending U.S. Appl. No. 11/617,247.
European Search Report issued in related application No. 06026496.7, completed Feb. 10, 2009 and mailed Feb. 19, 2009.

* cited by examiner

SUPERCHARGER WITH ELECTRIC MOTOR

This application claims priority from Japanese Patent Application No. 2005-227605, filed Aug. 5, 2005, the entire disclosure of which is incorporated herein by reference.

BACKGROUND OF THE INVENTION

1. Field of the Invention

The present invention relates to a supercharger with an electric motor, which has an electric motor assisting a rotational drive of a compressor and is driven by an exhaust gas of an internal combustion engine and compressing an intake air so as to supercharge.

2. Description of Related Art

In order to improve a performance of an internal combustion engine, there has been widely used a supercharger (also called as "turbocharger") driven by an exhaust gas of an internal combustion engine and compressing an intake air so as to supercharge. Further, there has been employed a supercharger with an electric motor in which an acceleration response or the like is improved by installing the electric motor on the same axis as a shaft of the supercharger and assisting a rotational drive of a compressor in an accelerated manner.

The following patent document 1 discloses a prior art relating to the supercharger with the electric motor. FIG. 1 is a cross sectional view showing a structure of a supercharger 50 with an electric motor disclosed in the patent document 1. In an inner portion of a housing 51 of the supercharger 50, a turbine impeller 52 is arranged in an exhaust passage side, a compressor impeller 53 is arranged in an intake passage side, and the turbine impeller 52 and the compressor impeller 53 are coupled by a shaft 54. The shaft 54 is rotatably supported by a bearing 55 installed in the housing 51. Further, in the housing 51, there is installed an electric motor 58 having a rotor 56 coaxially coupled to the shaft 54, and a stator 57 arranged around the rotor 56. In the supercharger 50 structured as mentioned above, the turbine impeller 52 is rotated by an exhaust gas from an internal combustion engine, the compressor impeller 53 coupled to the turbine impeller is rotationally driven, the rotational drive is assisted by the electric motor 58, and an intake is supercharged so as to be supplied to the internal combustion engine.

In the supercharger with the electric motor mentioned above, the electric motor 58 is rotated at a high speed during the operation of the supercharger, and is self-heated due to a windage loss and an eddy current loss. Further, since a high-temperature exhaust gas flows through the turbine, the electric motor 58 comes to a high temperature on the basis of a heat conduction from the turbine impeller 52 to the shaft 54, and from the shaft 54 to the rotor 56 of the electric motor 58. When the electric motor 58 comes to the high temperature, there are generated problems that an internal permanent magnet is demagnetized and an efficiency of the electric motor 58 is lowered. Accordingly, the supercharger in the patent document 1 is structured, as shown in FIG. 1, such that a cooling fluid flow path 60 is formed in an inner portion of a housing 51 so as to surround the electric motor 58, thereby flowing a cooling fluid 61 through the cooling fluid flow path 60 so as to cool the electric motor 58.

Further, the other prior art relating to the cooling of the electric motor in the supercharger with the electric motor is also disclosed in the following patent document 2. The supercharger with the electric motor disclosed in the patent document 2 is provided with a cooling gas introduction path 72 for introducing a part of an air in an outlet of an intercooler 71 to an inner portion of a housing 73 of a supercharger 70, and is structured such as to cool the electric motor 74 by the cooling air introduced to the inner portion of the housing 73, as shown in FIG. 2.

[Patent Document 1]
Japanese Unexamined Patent Publication No. 2003-293785

[Patent Document 2]
Japanese Unexamined Patent Publication No. 2005-69178

In the cooling structure in the patent document 1 mentioned above, it is possible to cool the stator 56 side of the electric motor 58, however, since the rotor 56 is arranged at the predetermined interval from the stator 57, it is impossible to sufficiently achieve the heat conduction to the rotor 56 side. Accordingly, it is impossible to sufficiently cool the rotor of the electric motor, and there remain the problems that the permanent magnet is demagnetized and the efficiency of the electric motor is lowered. Further, in order to solve the problem, there is considered a method of introducing the cooling air from the outlet of the intercooler 71 to the electric motor 70 as in the cooling structure shown in the patent document 2 mentioned above. However, in accordance with this method, since it is necessary to add an external piping such as the cooling gas introduction path 72, there is a problem that a weight and a cost of the supercharger itself are increased.

SUMMARY OF THE INVENTION

The present invention is made by taking the problems mentioned above into consideration, and an object of the present invention is to provide a supercharger with an electric motor which can effectively cool a stator and a rotor of the electric motor without adding any external piping, whereby it is possible to suppress a high temperature of the electric motor so as to prevent a permanent magnet from being demagnetized, and it is possible to prevent an efficiency of the electric motor from being lowered.

In order to achieve the object mentioned above, in accordance with a first aspect of the present invention, there is provided a supercharger with an electric motor comprising:
 a turbine impeller rotationally driven by an exhaust gas of an internal combustion engine;
 a turbine housing surrounding the turbine impeller;
 a compressor impeller coupled to the turbine impeller by a shaft and rotating so as to compress an intake air;
 a compressor housing surrounding the compressor impeller;
 an electric motor positioned between the turbine impeller and the compressor impeller and capable of rotationally driving the shaft; and
 a center housing rotatably supporting the shaft and having the electric motor built-in,
 wherein an inner side of the center housing is provided with an air introduction path introducing a part of a compressed air within the compressor housing to the electric motor, and a cooling structure portion cooling the air flowing through the air introduction path.

In accordance with a second aspect of the present invention, there is provided a supercharger with an electric motor as recited in the first aspect mentioned above, wherein the center housing has a cooling fluid flow path which is formed so as to surround the electric motor and puts a cooling fluid for cooling the electric motor in circulation inside, and the cooling structure portion is structured such as to be capable of heat exchanging between the cooling fluid and the air flowing through the air introduction path.

In accordance with a third aspect of the present invention, there is provided a supercharger with an electric motor as recited in the first aspect mentioned above, wherein the cooling structure portion is structured such as to be capable of heat exchanging between a lubricating fluid flowing within the center housing and the air flowing through the air introduction path.

In accordance with the first aspect mentioned above of the present invention, since a part of the air in the outlet side of the compressor housing is introduced to the rotor of the electric motor, and the air is cooled by the cooling structure portion in the introducing process, it is possible to effectively cool both of the stator and the rotor of the electric motor. Accordingly, it is possible to cool the permanent magnet of the electric motor so as to prevent the permanent magnet from coming to a high temperature. Further, since the air introduction path introducing the cooling air is formed within the center housing, it is possible to introduce the cooling air to the electric motor without adding any external piping.

In accordance with the second aspect mentioned above of the present invention, since the cooling fluid flow path for cooling the electric motor from the periphery thereof is provided, and the structure is made such that the heat exchange is executed between the air flowing through the air introduction path and the cooling fluid flowing through the cooling fluid flow path so as to cool the air, it is possible to structure the cooling means on the basis of a simple structure without forming any exclusive cooling system for cooling the air.

In accordance with the third aspect mentioned above of the present invention, since the structure is made such that the air is cooled by heat exchanging between the lubricating fluid flowing within the center housing and air flowing through the air introduction path, it is possible to structure the cooling means on the basis of a simple structure without forming any exclusive cooling system for cooling the air.

Therefore, in accordance with the present invention mentioned above, it is possible to effectively cool the stator and the rotor of the electric motor without adding any external piping, whereby it is possible to obtain an excellent effect that it is possible to prevent the electric motor from coming to the high temperature so as to prevent the permanent magnet from being demagnetized, and it is possible to prevent the efficiency of the electric motor from being lowered.

DESCRIPTION OF THE PREFERRED EMBODIMENTS

Figure 1:
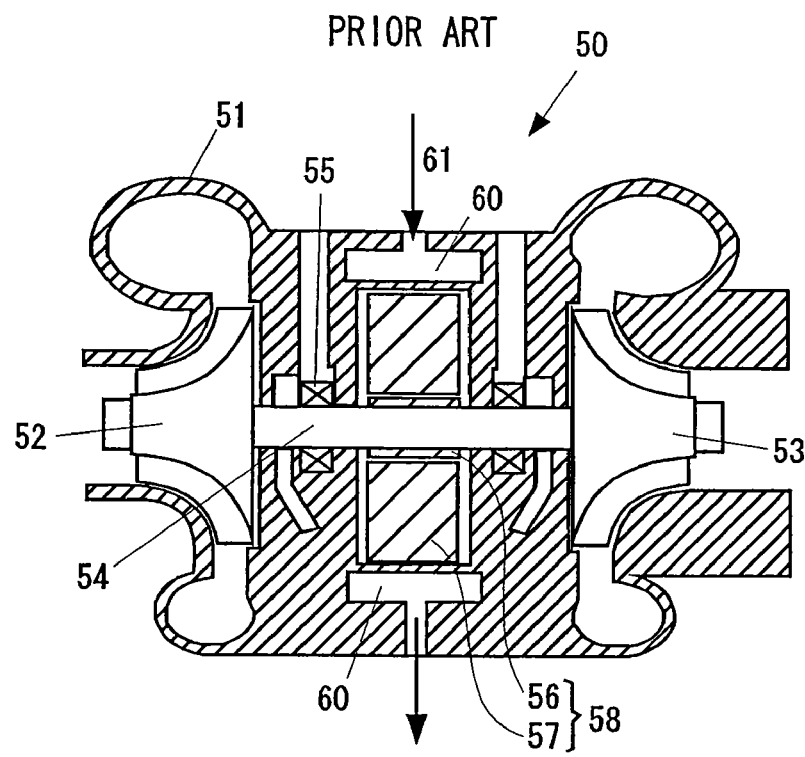
FIG. 1 is a view explaining a prior art.
Figure 2:
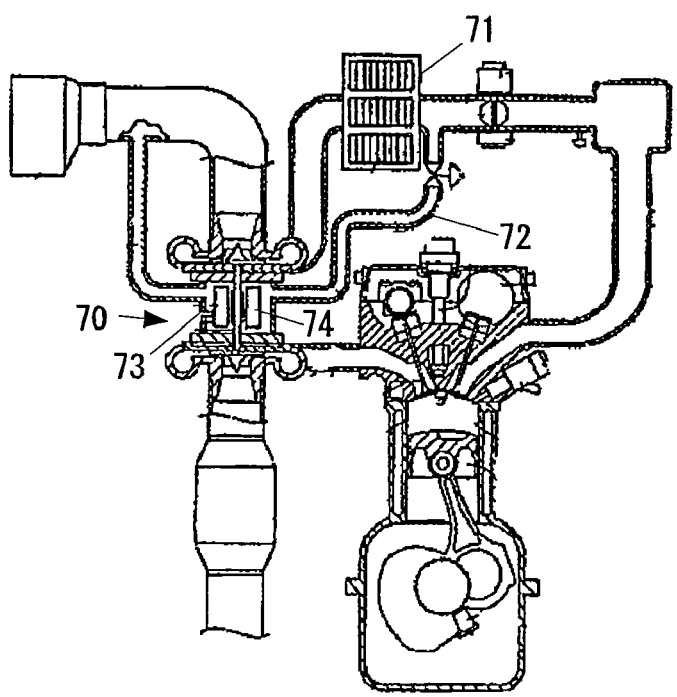
FIG. 2 is a view explaining the other prior art.

A description will be in detail given below of a preferable embodiment in accordance with the present invention with reference to the accompanying drawings. In this case, the same reference numerals are attached to the common portions in each of the drawings, and an overlapping description will be omitted.

Figure 3:
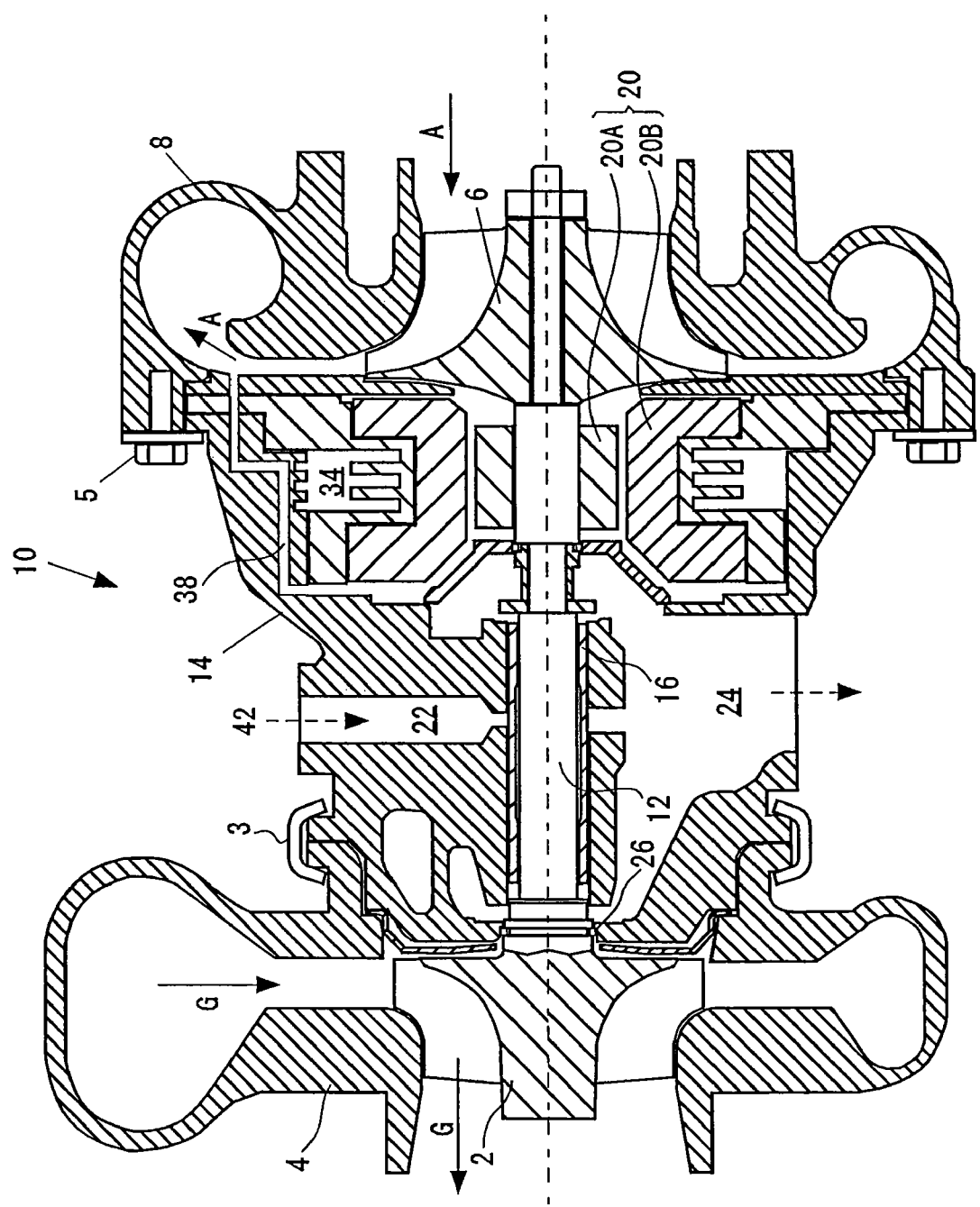
FIG. 3 is a cross sectional view showing an embodiment in accordance with the present invention.

FIG. 3 is a cross sectional view of a supercharger with an electric motor in accordance with the embodiment of the present invention. As shown in FIG. 3, the supercharger 10 with the electric motor is constituted by constituting elements such as a turbine impeller 2, a turbine housing 4, a shaft 12, a compressor impeller 6, a compressor housing 8, an electric motor 20, a center housing 14 and the like.

In an exhaust passage side, there are arranged the turbine impeller 2 rotationally driven by an exhaust gas G of an internal combustion engine, and the turbine housing 4 surrounding the turbine impeller 2. In an intake side passage, there are arranged the compressor impeller 6 compressing an intake air, and the compressor housing 8 surrounding the compressor impeller 6. The turbine impeller 2 and the compressor impeller 6 are coupled by the shaft 12, and the shaft 12 is rotatably supported by a bearing 16 installed in the center housing 14. The turbine housing 4 and the center housing 14 are coupled by a coupling 3, and the compressor housing 8 and the center housing are coupled by a bolt 5.

The electric motor 20 is installed in the center housing 14, and is constituted by a rotor 20A which is coaxially coupled to the shaft 12, rotates together with the shaft 12 and is formed by a permanent magnet, and a stator 20B which is arranged around the rotor 20A and is formed by a coil.

In the center housing 14, there are formed an oil supply path 22 for supplying a lubricating fluid 42 to the bearing 16, and an oil discharge path 24 for discharging the lubricating fluid 42 lubricating and cooling the bearing 16 while passing through an inner portion of the bearing 16. The structure is made such that the lubricating fluid 42 having a temperature, for example, about 80° C. is supplied to the oil supply path 22 by a lubricating fluid pump (not shown) installed in an external portion.

In the turbine impeller 2 side of the center housing 14, there is interposed a turbine side seal ring 26 for preventing the lubricating fluid 42 from leaking from a gap between the center housing 14 and the shaft 12.

Figure 4:
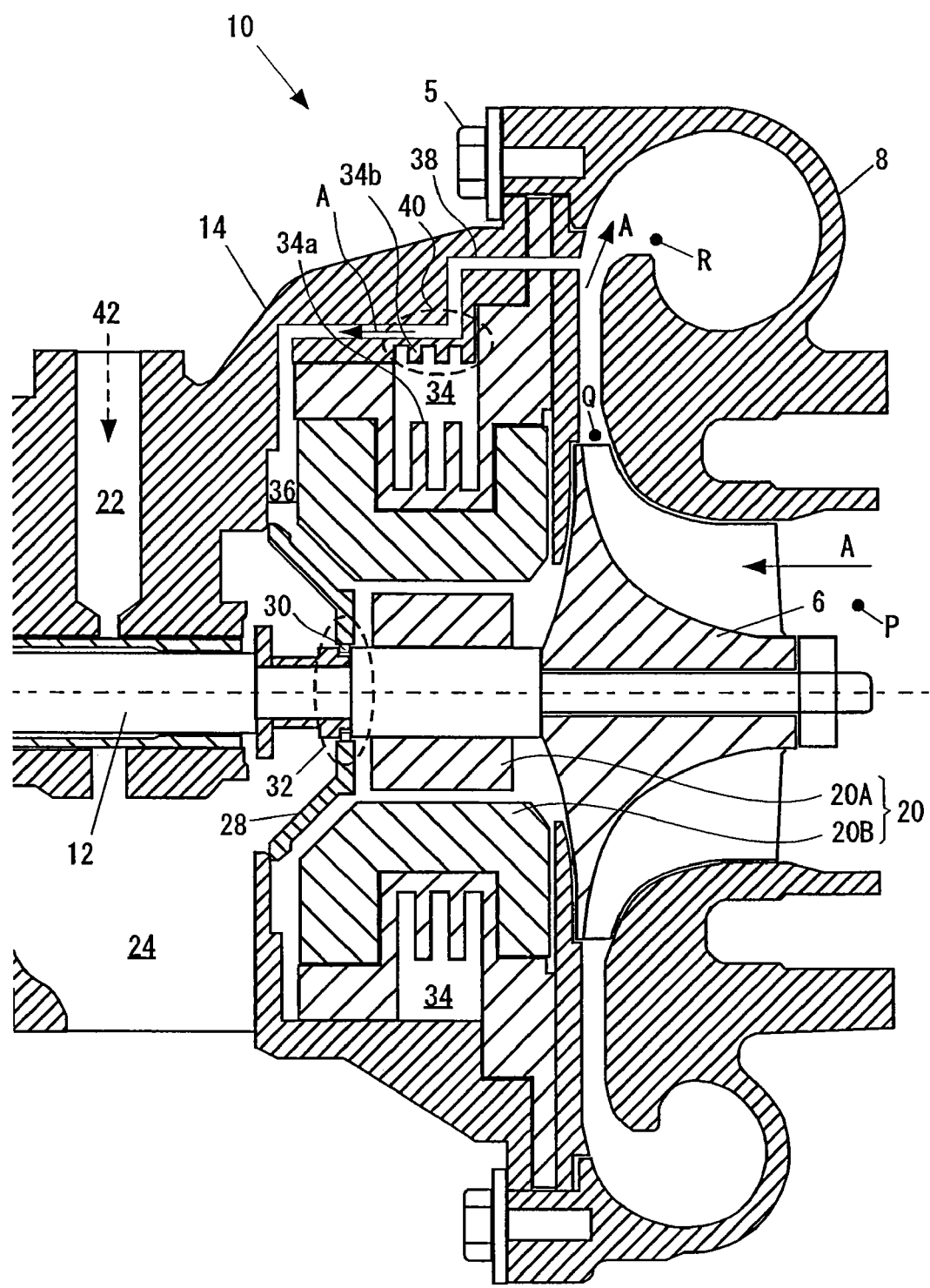
FIG. 4 is a partly enlarged view of FIG. 3.

FIG. 4 is a partly enlarged view of FIG. 3. As shown in FIG. 4, a compressor side seal ring 30 preventing the lubricating fluid from leaking from the gap is interposed between a seal plate 28 provided at a position between the electric motor 20 within the center housing 14 and the bearing portion, and the shaft 12, thereby constituting an oil seal portion.

Further, a cooling fluid flow path 34 is formed in the center housing 14 so as to surround the electric motor 20. The cooling fluid flow path 34 extends in a peripheral direction within the center housing 14 so as to be formed in an annular shape, and a cooling fluid for cooling the electric motor 20 is circulated in an inner portion thereof. The cooling fluid flow path 34 may be formed so as to completely make a circuit of an outer periphery of the electric motor 20, or may be formed in a C shape as seen from an axial direction of the shaft 12. A fin-shaped portion 34a is formed in an inner side in a diametrical direction of the cooling fluid flow path 34 so as to increase an efficiency of a heat conduction. The cooling fluid is supplied to the cooling fluid supply path 34 by a cooling fluid pump (not shown) installed in an external portion via a cooling fluid supply port (not shown), and is discharged to the external portion from a cooling fluid discharge port (not shown). In this case, the cooling fluid can employ, for example, a water. Further, a fuel (a gasoline or the like) in the internal combustion engine may be used as the cooling fluid.

Further, the inner portion of the center housing 14 is provided with an air introduction path 38 communicating an inner portion of the compressor housing 8 with a space 36 provided with the electric motor 20 within the center housing 14 and introducing a part of a compressed air A within the compressor housing 8 to the electric motor 20, and a cooling structure portion 40 cooling the air A flowing through the air introduction path 38.

In the present embodiment, the cooling structure portion 40 is structured such as to execute a heat exchange between the cooling fluid flowing through the cooling fluid flow path 34 and the air A flowing through the air introduction path 38. In other words, the air introduction path 38 is formed such as to pass near the cooling fluid flow path 34, and transmit a heat of the air A flowing through the air introduction path 38 to the cooling fluid in the cooling fluid flow path 34. It is preferable to form a portion corresponding to the cooling structure portion in the air introduction path 38 in a shape extending to some extent in a peripheral direction along the cooling fluid flow path 34, in order to secure such a heat transfer area that the heat exchange can be sufficiently executed between the air A flowing through the inner portion of the corresponding portion and the cooling liquid in the cooling fluid flow path 34. Further, a fin-shaped portion 34b is formed in an inner surface of the air introduction path 38 side in the cooling fluid flow path 34, thereby increasing an efficiency of the heat conduction.

In the supercharger 10 with the electric motor structured as mentioned above, the compressor impeller 6 coupled via the shaft 12 is rotationally driven by rotating the turbine impeller 2 on the basis of an exhaust gas G from the internal combustion engine, and the rotational drive is assisted by the electric motor 20. Further, the intake air is compressed and pressurized by the compressor impeller 6 so as to be supplied to the internal combustion engine. The air (at a point P) sucked by the compressor impeller 6 has a temperature, for example, 20° C. and a normal pressure, is increased, for example, to 180° C. and 1.5 atmospheric pressure in an impeller outlet (at a point Q), and is increased, for example, to 180° C. and 2.0 atmospheric pressure in a compressor housing outlet (at a point R).

Further, the cooling fluid is supplied to the cooling fluid flow path 34, thereby cooling the electric motor 20 from the periphery thereof. Further, a part of the compressed air A within the compressor housing 8 is introduced to the space 36 in the electric motor 20 side from the air introduction path 38. At this time, since the air A introduced to the air introduction path 38 from the inner side of the compressor housing 8 is compressed and pressurized by the compressor impeller 6, the air A comes to a high temperature (for example, 180° C.), however, since it is heat exchanged with the cooling fluid within the cooling fluid flow path 34 in the cooling structure portion 40 provided in the center housing 14, it is cooled to a low temperature (for example, 50° C.). As a result, the cooled air A is supplied to the space 36 in the electric motor 20 side. Accordingly, the rotor 20A of the electric motor 20 is directly cooled by the air A introduced from the air introduction path 38. In this case, the air A cooling the electric motor 20 is discharged from an air discharge path (not shown). Alternatively, the air A cooling the electric motor 20 may be returned to the point Q through the back face of the compressor impeller 6 without forming the air discharge path. In this case, it is possible to limit the reduction of the compressor performance to the minimum.

As mentioned above, in accordance with the supercharger 10 with the electric motor of the present invention mentioned above, since a part of the compressed air A within the compressor housing 8 is introduced to the rotor 20A of the electric motor 20, and the air is cooled by the cooling structure portion 40 in the introducing process thereof, it is possible to effectively cool both the stator 20B and the rotor 20A of the electric motor 20 on the basis of the introduced air A. Accordingly, it is possible to cool the permanent magnet of the electric motor 20 so as to suppress the temperature increase thereof. Further, since the air introduction path 38 introducing the cooling air A is formed within the center housing 14, it is possible to introduce the cooling air A to the electric motor without adding any external piping.

Further, in accordance with the supercharger 10 with the electric motor of the present invention, since the structure is made such that the cooling fluid flow path 34 is provided for cooling the electric motor 20 from the periphery thereof, and the air A is cooled on the basis of the heat exchange between the air flowing through the air introduction path 38 and the cooling fluid flowing through the cooling fluid flow path 34, the cooling structure portion can be structured on the basis of the simple structure without forming any exclusive cooling system for cooling the air introduced to the electric motor.

Therefore, in accordance with the supercharger with the electric motor of the present invention, it is possible to effectively cool the stator and the rotor of the electric motor without adding any external piping, whereby it is possible to obtain an excellent effect that it is possible to suppress the temperature increase of the electric motor so as to prevent the permanent magnet from being demagnetized, and it is possible to prevent the efficiency of the electric motor from being lowered.

Further, in accordance with the embodiment mentioned above, since the pressurized air A (for example, at 2.0 atmospheric pressure) within the compressor housing 8 is introduced to the electric motor 20 side, the pressure in the electric motor 20 side is increased. Accordingly, an inflow from the bearing 16 side through which the lubricating fluid flows can be suppressed on the basis of the high pressure in the electric motor 20 side, and there is obtained an effect that a sealing characteristic of the oil seal portion 32 is improved.

In this case, the embodiment mentioned above aims at the supercharger with the electric motor in which the bearing 16 of the shaft 12 is arranged in the turbine side, and the electric motor 20 is arranged in the compressor side, however, a range to which the present invention is applied is not limited to this, but can be applied, of course, to a supercharger with an electric motor of a type in which an electric motor is arranged in a center portion and bearings are arranged in both sides thereof.

Further, the embodiment mentioned above is structured such that the heat exchange is executed between the cooling fluid flowing through the cooling fluid flow path 34 and the air A flowing through the air introduction path 38, however, the structure may be made such that the heat exchange can be executed between the lubricating fluid 42 flowing within the center housing 14 and the air A flowing through the air introduction path 38, thereby cooling the air introduced to the electric motor 20. Further, the structure may be made such that the heat exchange can be executed between the external air and the air flowing through the air introduction path 38, thereby cooling the air introduced to the electric motor 20.

In addition, it goes without saying that the present invention is not limited to the embodiment mentioned above, but can be variously modified within the range of the scope of the present invention.

The invention claimed is:

1. A supercharger with an electric motor comprising:
    (a) a turbine impeller rotationally driven by an exhaust gas of an internal combustion engine;
    (b) a turbine housing surrounding the turbine impeller;
    (c) a compressor impeller coupled to the turbine impeller by a shaft and rotating so as to compress an intake air;
    (d) a compressor housing surrounding the compressor impeller;
    (e) an electric motor positioned between the turbine impeller and the compressor impeller and disposed to rotationally drive the shaft; and
    (f) a center housing rotatably supporting the shaft and having the electric motor built-in, wherein an inner side of the center housing is provided with
  i. an air introduction path disposed to introduce compressed air that is discharged from an outlet of the compressor impeller within the compressor housing to the electric motor;
  ii. a cooling structure portion disposed to cool air flowing through the air introduction path; and
  iii. a cooling fluid flow path formed so as to surround the electric motor, wherein the air introduction path is disposed to flow compressed air toward a turbine impeller side of the supercharger so as to introduce compressed air to a turbine impeller side of the electric motor, wherein the cooling structure portion is formed on an outside position of the cooling fluid flow path, and the cooling structure portion is disposed to exchange heat between cooling fluid flowing in the cooling fluid flow path and air flowing through the air introduction path.

2. The supercharger with the electric motor as claimed in claim 1, wherein the air introduction path is structured so as to exchange heat between a lubricating fluid flowing within the center housing and air flowing through the air introduction path.

3. The supercharger with the electric motor as claimed in claim 2, wherein the exchange of heat between the cooling fluid in the cooling fluid flow path and the air flowing in the air introduction path cools both a stator and a rotor of the electric motor.

4. The supercharger with the electric motor as claimed in claim 1, wherein the cooling fluid flow path is provided with a fin-shaped portion disposed at an inner surface of the air introduction path.

5. The supercharger with the electric motor as claimed in claim 4, wherein the exchange of heat between the cooling fluid in the cooling fluid flow path and the air flowing in the air introduction path cools both a stator and a rotor of the electric motor.

6. The supercharger with the electric motor as claimed in claim 1, wherein the exchange of heat between the cooling fluid in the cooling fluid flow path and the air flowing in the air introduction path cools both a stator and a rotor of the electric motor.

7. The supercharger with the electric motor as claimed in claim 1, wherein the center housing is provided with a space disposed to cool air flowing from the air introduction path so that cool air is directly introduced to a rotor of the electric motor.

* * * * *